INVENTOR.
ROBERT T. EDDY
BY
William N. Antonis
ATTORNEY

३,२६७,८६४
EFFORT SELECTOR
Robert T. Eddy, South Bend, Ind., assignor to The Bendix Corporation, South Bend, Ind., a corporation of Delaware
Filed Nov. 2, 1964, Ser. No. 408,246
6 Claims. (Cl. 103—42)

This invention relates to power steering and more particularly to an effort selector device for use in conjunction with a hydraulic power steering system.

One of the objects of this invention is to provide a device for conveniently adjusting driving efforts to correspond to individual driver tastes.

Another object of this invention is to provide an effort selector device which will function without sacrificing steering speed.

A further object of this invention is to provide an effort selector device which can be used in conjunction with any relatively inexpensive power steering control valve having relatively poor "feel" to improve the "feel" characteristics of said valve to any desired value.

More specifically, it is an object of this invention to provide an effort selector device which will provide a variation in road feel by passing a controlled amount of fluid between the pressure and return lines of the hydraulic steering system. As additional fluid is bypassed through the effort selector device, larger power steering control valve movements are required to achieve a given differential cylinder pressure thereby resulting in higher driving efforts.

Figure 1:
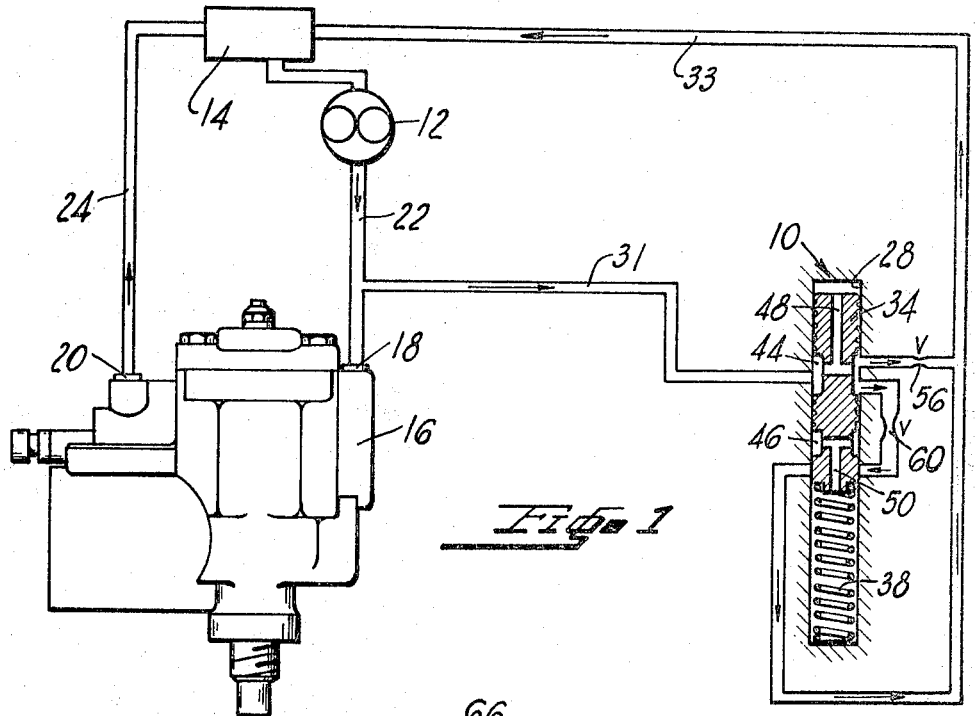
Figure 2:
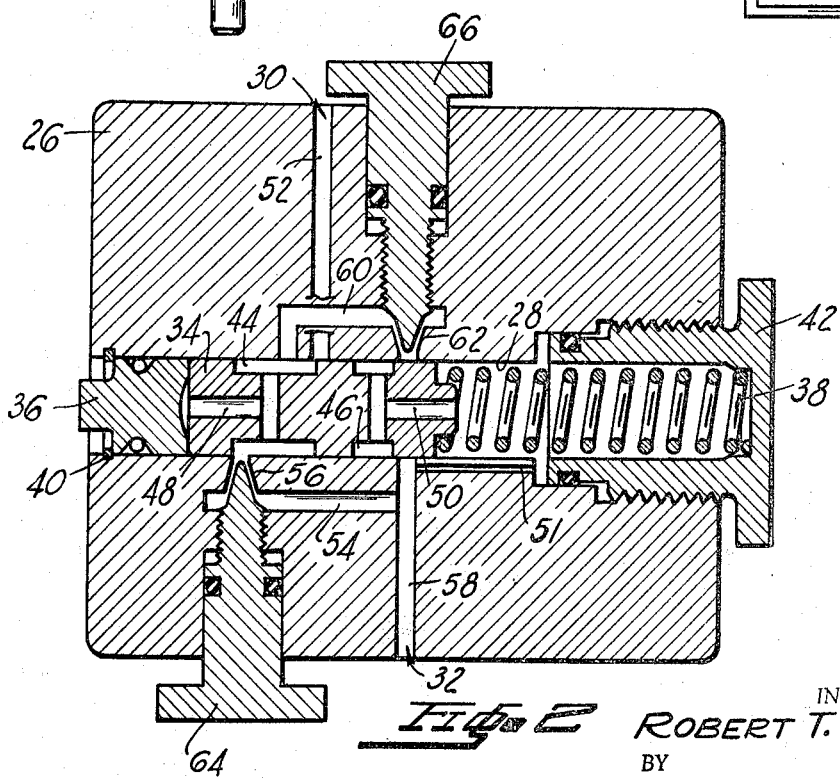

The above and other objects and features of this invention will be apparent from the following description of the mechanism taken in connection with the accompanying drawing which forms a part of this disclosure and in which:

FIGURE 1 is a schematic illustration of the invention shown in conjunction with a hydraulic power steering system; and FIGURE 2 is a sectional view of the effort selector device shown in the system of FIGURE 1.

Referring to FIGURE 1, it will be seen that numeral 10 designates an effort selector device incorporated in a hydraulic power steering system which includes a pump 12, a reservoir 14, and a suitable power steering unit 16. The power steering unit which is shown is of the "integral" type wherein the steering gear, control valve, and power cylinder are integrally packaged, or may be of the "semi-integral" type, as shown in Vickers et al. Patent No. 3,145,626 wherein the power cylinder is disposed apart from the other power steering components. It will be understood that the effort selector device 10 can be used in conjunction with any hydraulic power steering system and need only be interposed between the pump and the inlet port of the power steering control valve so that a controlled amount of fluid can bypass the control valve. Referring specifically to FIGURE 1, it will be noted that the power steering unit includes a pressure port 18 and a return port 20 both of which communicate with the hydraulic control valve (not shown). Pressure conduit 22 and return conduit 24 communicate respectively with pressure port 18 and return port 20.

The effort selector device 10 comprises a valve housing 26 having a bore 28 therein and inlet and outlet ports 30 and 32. Inlet port 30 communicates with pressure conduit 22 via conduit 31 while outlet port 32 communicates with the reservoir via conduit 33. Located within the bore is a cylindrical plunger 34 which is urged towards a stop plug 36 by spring 38. The plug is retained in the bore by a snap ring 40 while the spring is confined in the bore by the hollow adjusting screw 42 which is utilized to set the preload of the spring to any desired predetermined value. Located on the plunger 34 are two annular grooves 44 and 46, one of which communicates with one end of the plunger through passage 48 and the other of which communicates with the other end of the plunger through passage 50. A bleed 51 communicates the spring end of the plunger with outlet port 32. Flow from inlet port 30 to outlet port 32 will occur through one of two flow paths, the first of which includes passage 52, annular groove 44, passage 54 containing variable orifice 56, and passage 58, and the second of which includes passage 52, annular groove 44, passage 60 containing variable orifice 62, annular groove 46, and passage 58. Orifices 56 and 62 can be varied, as desired, by rotating needle valves 64 and 66, respectively, which are threaded into housing 26. The system is arranged so that variable orifice 56 controls low pressure steering requirements such as highway driving, whereas variable orifice 62 controls moderate to high pressure steering requirements such as hard highway or city cornering. For example, the preload of spring 38 could be set so that for pressure between 0–100 p.s.i. flow would be through the first variable orifice, namely orifice 56, whereas for pressure between 100–400 p.s.i. flow would be through the second variable orifice, namely orifice 62. At pressures over 400 p.s.i., such as those which occur during parking, flow through both variable orifices 56 and 62 will be cut off.

The effort selector device works on the principle that for any given power steering maneuver a certain range of pressures is required. If a portion of the supply or pressure fluid from the pump to the power steering control valve bypasses the control valve and is returned to the reservoir, larger control valve movements are needed to achieve the desired range of pressures. Since such larger control valve movements can be achieved only by additional driver steering efforts, it will be obvious that the steering efforts are proportional to the amount of fluid being bypassed through variable orifices 56 and 62 of the effort selector device. In other words, if the size of the variable orifices is increased, steering efforts will be increased. If the size is decreased, steering efforts will likewise decrease. Thus, any desired effort for any given type of driving can be controlled by varying the orifices 56 and 62 by rotating needle valves 64 and 66.

Specific operation of the effort selector, which in effect is a pressure sensitive bypass valve, is as follows: Initially, flow from bypass conduit 31 will occur through inlet port 30, passage 52, annular groove 44, restricted orifice 56, passages 54 and 58, and outlet port 32. At the same time, pressure fluid is conveyed to the end of plunger 34 through passage 48. As the fluid pressure at this end increases, the plunger will be moved in a direction tending to compress spring 38. At some given pressure, depending on the preload of spring 38, the plunger will have moved sufficiently to cut off flow between annular groove 44 and restricted orifice 56. When this occurs, annular groove 46 will have moved to a position which will permit communication between restricted orifice 62 and annular groove 46, thereby permitting flow from bypass conduit 31 to occur through inlet port 30, passage 52, passage 60, restricted orifice 62, annular groove 46, passage 58, and outlet port 32. Upon further increase of fluid pressure on the end of the plunger, such as that which may occur during parking, plunger 34 will have moved to a position wherein neither annular groove 44 will communicate with restricted orifice 56 nor annular groove 46 will communicate with restricted orifice 62 in which case no fluid will be bypassed at all.

The several practical advantages which flow from this invention are believed to be obvious from the above description, and other advantages may suggest themselves to those who are familiar with the art to which the invention relates.

Furthermore, although this invention has been described in connection with certain specific embodiments, it will be obvious to those skilled in the art that various changes may be made in the form, structure, and arrangement of parts without departing from the spirit of the invention. Accordingly, applicant does not desire to be limited to the specific embodiments disclosed herein primarily for purposes of illustration, but instead desire protection falling within the scope of the appended claims.

Having thus described the various features of the invention, what I claim as new and desire to secure by Letters Patent is:

1. In a hydraulic power steering system having a pump and a control valve, an effort selector device for permitting a portion of the fluid flowing from said pump to said control valve to bypass said control valve, said device comprising a housing, an inlet port in said housing for receiving the fluid being bypassed, an outlet port in said housing for returning the bypassed fluid to said system, first and second passage means located in said housing for communicating said inlet port with said outlet port, first restricted orifice means located in said first passage means and second restricted orifice means located in said second passage means, means operatively connected to said first and second orifice means for varying the restriction therein, and means responsive to the fluid pressure at said inlet port for controlling flow through said first and second passage means, said pressure responsive means having a first position at a pressure below a predetermined value for permitting fluid flow through said first passage means and a second position at a pressure above a predetermined value for permitting fluid flow through said second passage means.

2. In a hydraulic power steering system having a pump and a control valve, an effort selector device for permitting a portion of the fluid flowing from said pump to said control valve to bypass said control valve, said device comprising a housing having a bore therein, an inlet port in said housing for receiving the fluid being bypassed, an outlet port in said housing for returning the bypassed fluid to said system, passage means located in said housing for communicating said inlet port with said outlet port via said bore, restricted orifice means located in said passage means, means operatively connected to said orifice means for varying the restriction therein, and a plunger located in said bore and movably responsive to the fluid pressure at said inlet port for controlling flow through said passage means.

3. In a hydraulic power steering system having a pump and a control valve, an effort selector device for permitting a portion of the fluid flowing from said pump to said control valve to bypass said control valve, said device comprising a housing having a bore therein, an inlet port in said housing for receiving the fluid being bypassed, an outlet port in said housing for returning the bypassed fluid to said system, first and second passage means located in said housing for communicating said inlet port with said outlet port via said bore, first restricted orifice means located in said first passage means and second restricted orifice means located in said second passage means, means operatively connected to said first and second orifice means for varying the restriction therein, a plunger located in said bore and movably responsive to the fluid pressure at said inlet port for controlling flow through said first and second passage means, said plunger having a first position at a pressure below a predetermined value for permitting fluid flow through said first passage means and a second position at a pressure above a predetermined value for permitting fluid flow through said second passage means.

4. An effort selector device, as defined in claim 3, wherein said plunger includes first and second annular grooves formed thereon, said first annular groove permitting flow through said first passage means when said plunger is in said first position, and said second annular groove permitting flow through said second passage means when said plunger is in said second position.

5. An effort selector device, as defined in claim 4, wherein spring means are located in said bore to oppose movement of said plunger and fluid pressure at said inlet port is communicated to one end of said plunger via said first annular groove and a passage in said plunger to thereby move said plunger against said spring means.

6. An effort selector device, as defined in claim 3, wherein said means for varying the restriction in said orifice means includes a movable needle valve member.

References Cited by the Examiner
UNITED STATES PATENTS

| | | | |
|---|---|---|---|
| 2,709,339 | 5/1955 | Edelman et al. | 103—42 |
| 2,767,726 | 10/1956 | Feucht | 137—494 |
| 2,890,715 | 6/1959 | Ebersold | 137—494 |
| 3,215,236 | 11/1965 | Pensa | 137—494 |

MARK NEWMAN, *Primary Examiner.*

W. J. KRAUSS, *Assistant Examiner.*